United States Patent [19]

Ogawa et al.

[11] Patent Number: 4,871,243

[45] Date of Patent: Oct. 3, 1989

[54] PHOTOGRAPHIC LENS OF IMPROVED NEAR DISTANCE PERFORMANCE

[75] Inventors: Hideki Ogawa, Tokyo; Takashi Matsushita, Kanagawa, both of Japan

[73] Assignee: Canon Kabushiki Kaisha, Tokyo, Japan

[21] Appl. No.: 175,351

[22] Filed: Mar. 30, 1988

[30] Foreign Application Priority Data

Apr. 3, 1987 [JP] Japan .................. 62-082251

[51] Int. Cl.$^4$ .................. G02B 15/22; G02B 9/64
[52] U.S. Cl. .................. 350/463; 350/428
[58] Field of Search .................. 350/463, 428

[56] References Cited

U.S. PATENT DOCUMENTS

| | | |
|---|---|---|
| 2,537,912 | 1/1951 | Reiss . |
| 3,815,974 | 6/1974 | Momiyama . |
| 4,392,724 | 7/1983 | Hamanishi .................. 350/463 |
| 4,553,823 | 11/1985 | Kato et al. . |

FOREIGN PATENT DOCUMENTS

| | | |
|---|---|---|
| 48-90520 | 11/1973 | Japan . |
| 52-7723 | 1/1977 | Japan . |
| 57-8513 | 1/1982 | Japan . |
| 57-46222 | 3/1982 | Japan . |
| 57-192916 | 11/1982 | Japan . |
| 60-143116 | 7/1985 | Japan . |
| 62-177509 | 8/1987 | Japan . |
| 62-177510 | 8/1987 | Japan . |

Primary Examiner—Bruce Y. Arnold
Assistant Examiner—Rebecca D. Gass
Attorney, Agent, or Firm—Fitzpatrick, Cella, Harper & Scinto

[57] ABSTRACT

A photographic lens comprising, from front to rear, a first lens unit of positive power, a stop, a second lens unit of positive power, a third lens unit of negative power and a fourth lens unit of positive power. The first lens unit has at least one negative lens having a strong concave surface facing the stop, and the second lens unit has at least one negative lens having a strong concave surface facing the stop. When focusing is performed from an infinitely distant object to a close object, the first and second lens units are moved forward in unison, while the third lens unit is moved by a less amount than the amount of movement of the first and second lens units, whereby closeup optical performance is improved.

9 Claims, 6 Drawing Sheets

PHOTOGRAPHIC LENS OF IMPROVED NEAR DISTANCE PERFORMANCE

BACKGROUND OF THE INVENTION

1. Field of the Invention

This invention relates to photographic lenses utilizing "floating" and which are suited to cameras for photography, video cameras, etc. and, more particularly, to high performance photographic lenses utilizing floating and well corrected for aberrations when focusing on an object in a wide range from an infinitely distant object to a close object for high image magnification.

2. Description of the Related Art

In the past, in still cameras and video cameras, among the photographic lenses having their main aim to shoot close objects, there is what is called the macro lens or the micro lens (hereinafter referred to as "macro lens".) The macro lens is designed so as to obtain high optical performance particularly on close objects compared with the other general photographic lenses such as standard lenses, telephoto lenses, etc. Also, the macro lens in many cases is used even on objects of a wide range from a close object to an infinitely distant object.

In general, in the macro lens, when the range of image magnifications is extended, particularly when extended toward higher magnifications, a change of image magnification is accompanied by production of many variations in aberration, and it becomes difficult to correct this.

For example, in a macro lens having a large aperture ratio, when focusing is effected down to a close-up region, the spherical aberration becomes under-corrected, and the curvature of field is also worsened, and further, a large outward coma is produced. Particularly, the astigmatism and coma are increased largely in terms of 3rd and 5th order ones. Good correction of these aberrations becomes very difficult to maintain in a stable condition.

The method for correcting the variation of aberrations of a large relative aperture lens such as the GAUSS lens with variations of the image magnification when shooting from an infinitely distant object to a close object is known, for example, as discussed in U.S. Pat. No. 2,537,912, and U.S. Pat. No. 3,815,974. Also, recent proposals are made in Japanese Laid-Open Patent Applications Nos. Sho 48-90520, 52-7723, 57-8513, 57-46222, 57-192916 (U.S. Pat. No. 4,553,823), 59-143116, 62-177509 (U.S. patent application Ser. No. 007,626) and 62-177510. Any of the photographic lenses proposed in these documents utilizes at least two lens units made to move independently when focusing (so-called "floating"). However, any of the photographic lenses proposed in these documents corrects for aberration in near distance shooting of low magnification, but the correction effect is not always sufficient in shooting high magnification object, for example, life-size or thereabout. For example, the coma is relatively well corrected in low magnification, but as the magnification becomes high, there is a tendency to produce large distortion.

SUMMARY OF THE INVENTION

An object of the invention is to provide a photographic lens well corrected for variation of aberrations when focusing on an object in a wide range from an infinitely distant object to a close object, particularly with image magnification to the neighborhood of life-size, with large aperture ratio and high performance, and utilizing floating.

DETAILED DESCRIPTION OF THE PREFERRED EMBODIMENTS

Figure 1:
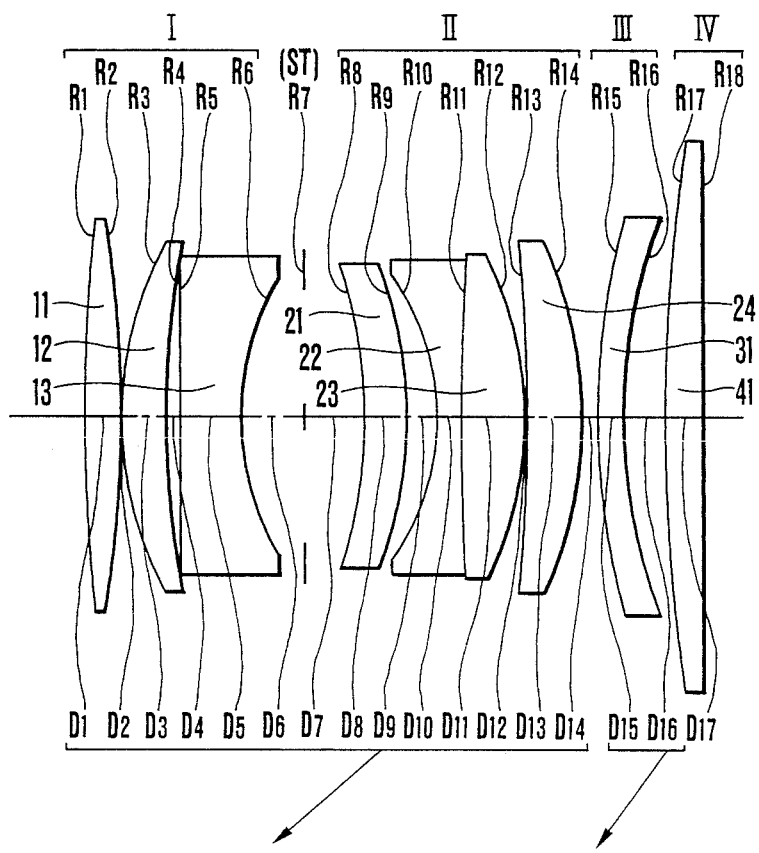
FIG. 1, FIG. 2 and FIG. 3 are lens sectional diagrams of numerical embodiments 1, 2 and 3 of the invention respectively.
Figure 2:
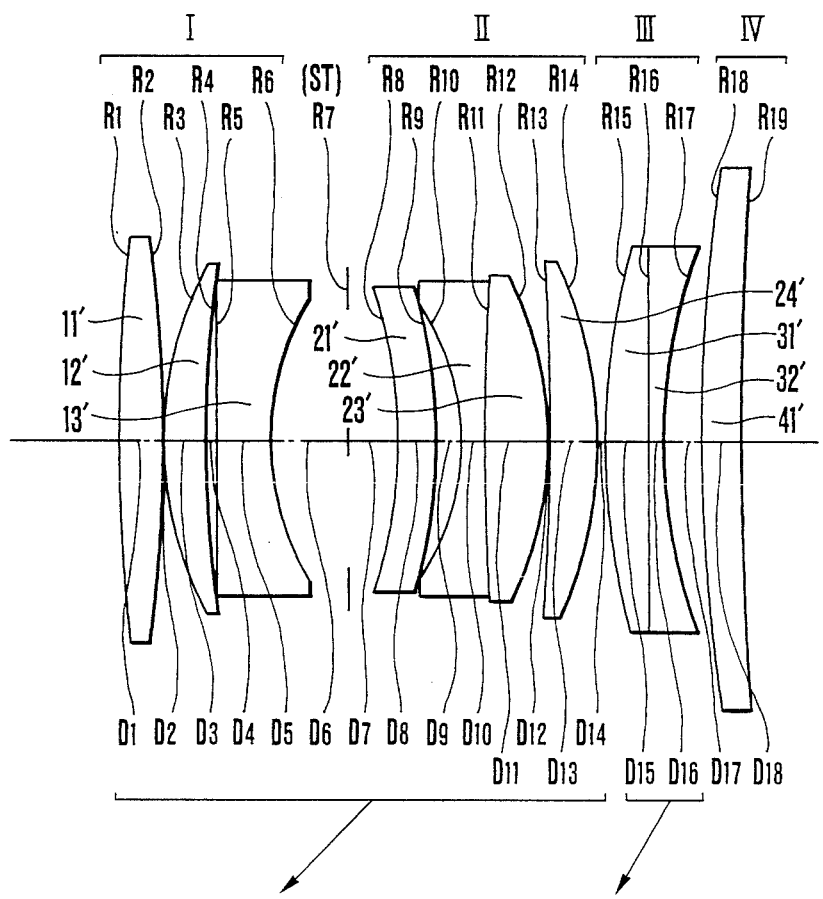
Figure 3:
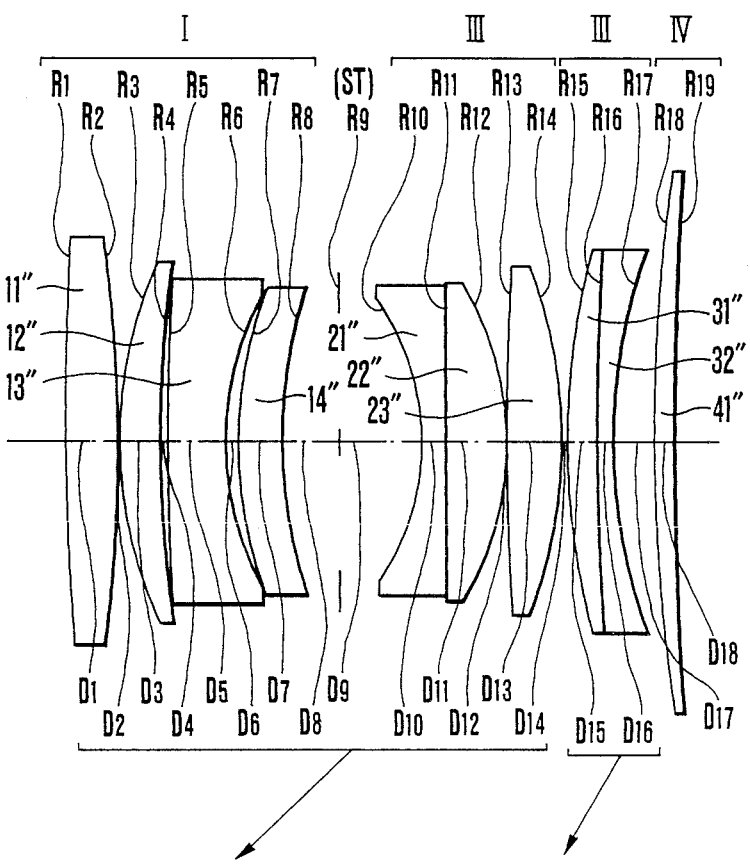

FIG. 1, FIG. 2 and FIG. 3 are lens sectional diagrams of the numerical embodiments 1, 2 and 3 of the invention. In the figures, I is a first lens unit of positive refractive power, II is a second lens unit of positive refractive power, III is a third lens unit of negative refractive power, IV is a fourth lens unit of positive refractive power, ST is a stop. Also, arrows show the directions of movement of each lens unit when focusing is performed from an infinitely distant object to a close object.

In the present embodiment, as described before, of the four lens units of predetermined refractive powers, the fourth lens unit IV is made fixed, a front lens part consisting of the first lens unit I, and the stop ST and the second lens unit II is moved forward, while the third lens unit III is moved less (or slower) than the front lens part, so that the variation of aberrations when focusing from an infinitely distant object to a close object, particularly the variation of the aberrations in the neighborhood of life-size magnification is well corrected, and high optical performance for a wide range of object distances is obtained.

Also, the first lens unit I is constructed so as to have at least one negative lens 13 having a strong concave surface facing the image plane side, and the second lens unit II has at least one negative lens 22 having a strong concave surface facing the object side, so that the aberrations, in particular, spherical aberrations, at higher orders of the time of change of the object distance are well corrected. It should be noted that the term "strong surface" means that its power is stronger than that of the other surface.

In general, because the divergence of the light beam from the object point becomes stronger in shooting a close object than in shooting an infinitely distant object, the height of incidence of the on-axis light beam on the photograhic lens becomes higher. For this reason, taking an example of the GAUSS type or modified GAUSS photographic lens as in the present embodiment to be described later, in focusing from an infinitely distant object to a close object, the spherical aberration changes to the negative direction due to the positive power the second lens unit has as the peculiar performance, and in accompaniment therewith an outward coma is produced and astigmatism worsens. Of these, as to the variation of the spherical aberration, by making a good balance of the higher order aberrations in the first lens unit I and the second lens unit II of the GAUSS system, although the annular spherical aberration remains more or less present, the spherical aberrations of low and high orders can be relatively well corrected.

However, as for the off-axis aberrations such as astigmatism and coma, even if they are made to lie within an acceptable range for the farther object and the aberration correction is set in such a direction as to be corrected at the time of the close object, the amount of variation becomes extremely large. For this reason, as light goes to off-axis, the deterioration of the optical performance increases.

Therefore, in order to preserve good optical performance up to the margin of the picture frame even in shooting a close object, it is necessary to correct the variation of the astigmatism and coma without giving a bad influence to the spherical aberration, distortion, etc.

For this reason, in the present embodiment, as described before, of the four lens units, when focusing from an infinitely distant object ot a close object, the first lens unit I and second lens unit II of the prescribed refractive powers with inclusion of the stop ST also are moved forward in unison, while the third lens unit III is moved forward by a less amount, and further the fourth lens unit IV is fixed, the variation of astigmatism, coma, etc. is well corrected without giving a bad influence to the spherical aberration, distortion, etc.

Next, the lens structure of each numerical embodiment of the invention is described. The numerical embodiment 1 is that the first lens unit I comprises, from front to rear, a lens 11 of which both the lens surfaces are convex surfaces, a meniscus-shaped positive lens 12 having a concave surface facing the image plane side, a lens 13 of which both the lens surfaces are concave surfaces and having the stronger concave surface facing the image plane side, the second lens unit II comprises four lenses or, a meniscus-shaped positive lens 21 having a concave surface facing the object side, a lens 22 of which both lens surfaces are concave surfaces and having the stronger concave surface facing the object side, a lens 23 of which both the lens surfaces are convex surfaces and having the stronger convex surface facing the image plane side, and a meniscus-shaped positive lens 24 having a concave surface facing the object side. Of these lenses, the lens 22 and the lens 23 are cemented together to form a cemented lens. The third lens unit III comprises a meniscus-shaped negative lens 31 having a concave surface facing the image plane side, and the fourth lens unit IV comprises a meniscus-shaped positive lens 41 having a weak concave surface facing the image plane side. The negative lens 22 in the second lens unit II is effective for minimizing the variation of spherical aberration and coma, weakening the divergence of the on-axis light beam diverging from the first lens unit I in shooting a close object to lower the height of incidence on that lens which follows in the second lens unit II so that the spherical aberration is prevented from becoming under-corrected.

Also, because the angle of incidence of the light ray on the lens surface R9 of the image plane side of the lens 21 becomes gentle, the outward coma that the lens surface R9 produces can also be suppressed to a minimum.

The off-axis light beam passes through the second lens unit II, when focusing is effected on a close object, due to the influence of the positive refractive power of the second lens unit II, particularly the meridional image surface becomes more under-corrected than the sagittal image surface. However, in the present embodiment, lens movement is made so that the space between the second lens unit II and the third lens unit III widens to increase the height of incidence on the meniscus-shaped negative lens of the third lens unit III, so that the meridional image surface is corrected, and the astigmatism is well corrected. At once with the movement, the space between the third lens unit III and the fourth lens unit IV is widened to increase the height of incidence on the meniscus-shaped positive lens of the fourth lens unit IV, thereby the astigmatism is well corrected and the production of outward coma is also suppressed.

Conversely as to the on-axis light beam, the widening of both the space between the second lens unit II and the third lens unit III and the space between the third lens unit III and the fourth lens unit IV results in lowering the height of incidence. Therefore, almost no influence is given to the spherical aberration.

Here, in order to further well correct astigmatism, it is preferred that the third lens unit III is constructed, as in the numerical embodiment 2 or the numerical embodiment 3, from a meniscus-shaped lens convex toward the object side with a positive lens 31' or 31" and a negative lens 32' or 32" cemented together.

It should be noted that in the numerical embodiment 3, as compared with the numerical embodiments 1 and 2, a positive meniscus-shaped lens 14" having a convex surface facing the object side is coupled to the rear part of the first lens unit I, so that the first lens unit I is constructed from the four lenses as a whole. It should also be noted that the lens of the second lens unit II which is just after the stop ST, or the lens 21 or 21', is omitted so that the second lens unit II is constructed in 2-component 3-element form from a cemented lens (21" and 22") and a positive lens (23"), whereby, similar to the numerical embodiments 1 and 2, the variation of aberrations with variation of the object distance is well corrected.

Next, the characteristics of numerical embodiments 1-3 of the invention are shown below. In the numerical embodiments 1-3, Ri is the radius of curvature of the i-th lens surface from the object side, Di is the i-th lens thickness and air separation consecutively from the object side, Ni and νi are respectively the refractive index and Abbe number of the i-th glass from the object side.

Figure 4A:
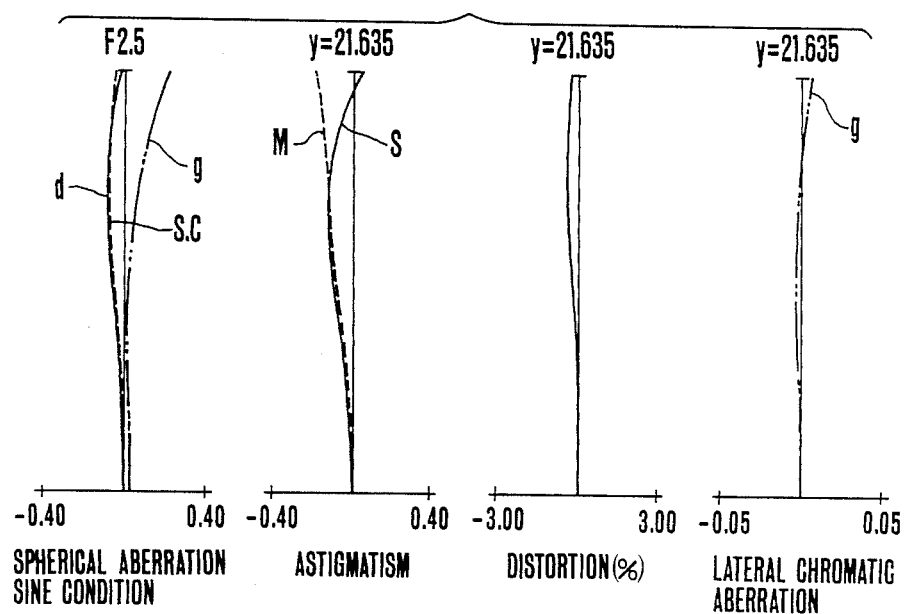
FIGS. 4(A), 4(B), FIGS. 5(A), 5(B) and FIGS. 6(A), 6(B) are graphs of the various aberrations of the numerical embodiments 1, 2 and 3 of the invention, respectively.
Figure 4B:
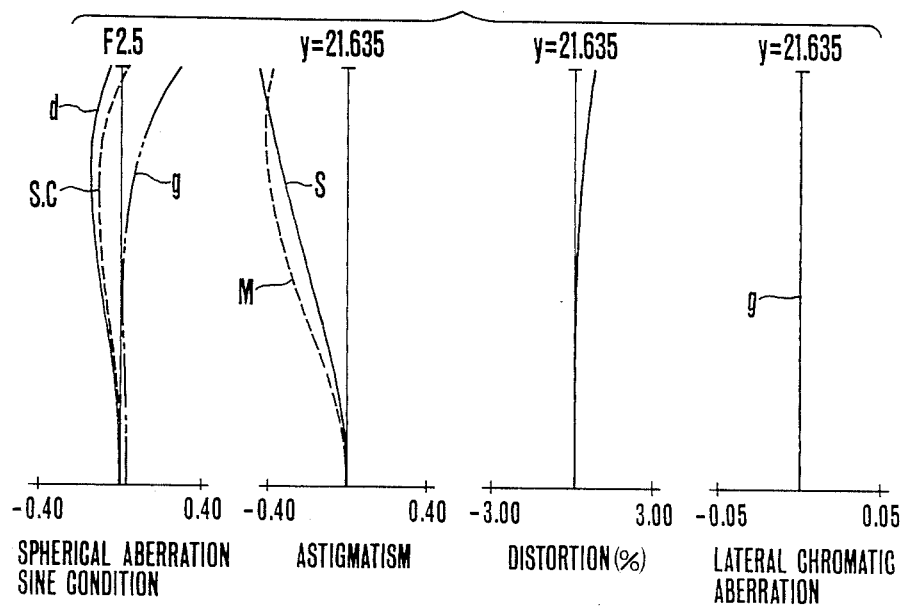

| Numerical Embodiment 1 (FIGS. 1, 4(A) and 4(B)): | | | |
|---|---|---|---|
| $f = 51.0$ $F = 2.5$ | | | |
| R1 = 105.145 | D1 = 2.24 | N1 = 1.69680 | ν1 = 55.5 |
| R2 = −95.529 | D2 = 0.15 | | |
| R3 = 23.914 | D3 = 2.77 | N2 = 1.80610 | ν2 = 40.9 |
| R4 = 69.621 | D4 = 0.73 | | |
| R5 = −762.053 | D5 = 3.95 | N3 = 1.70154 | ν3 = 41.2 |
| R6 = 17.302 | D6 = 3.98 | | |
| R7 = Stop | D7 = 3.64 | | |
| R8 = −32.584 | D8 = 2.86 | N4 = 1.71736 | ν4 = 29.5 |
| R9 = −25.234 | D9 = 1.72 | | |
| R10 = −14.871 | D10 = 1.69 | N5 = 1.80518 | ν5 = 25.4 |
| R11 = 456.398 | D11 = 3.78 | N6 = 1.83400 | ν6 = 37.2 |
| R12 = −23.214 | D12 = 0.15 | | |
| R13 = −209.302 | D13 = 3.48 | N7 = 1.80400 | ν7 = 46.6 |
| R14 = −27.347 | D14 = Variable | | |
| R15 = 49.197 | D15 = 1.74 | N8 = 1.77250 | ν8 = 49.6 |
| R16 = 35.114 | D16 = Variable | | |
| R17 = 138.516 | D17 = 2.29 | N9 = 1.53172 | ν9 = 48.9 |
| R18 = 25379.660 | | | |

| | Image Magnification | |
|---|---|---|
| | Infinitely Distant Object | Life-Size |
| D14 | 0.994 | 25.994 |
| D16 | 2.485 | 27.485 |

Figure 5A:
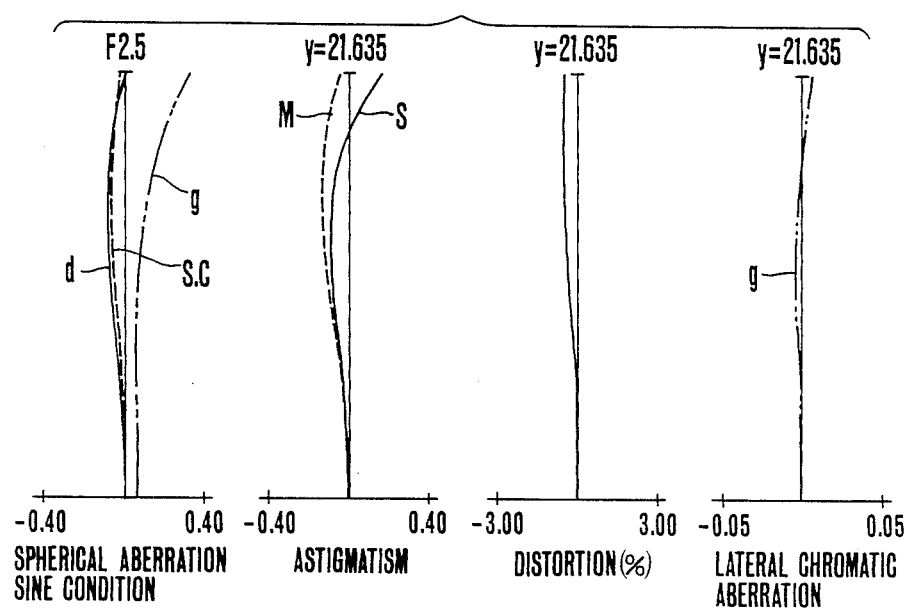
Figure 5B:
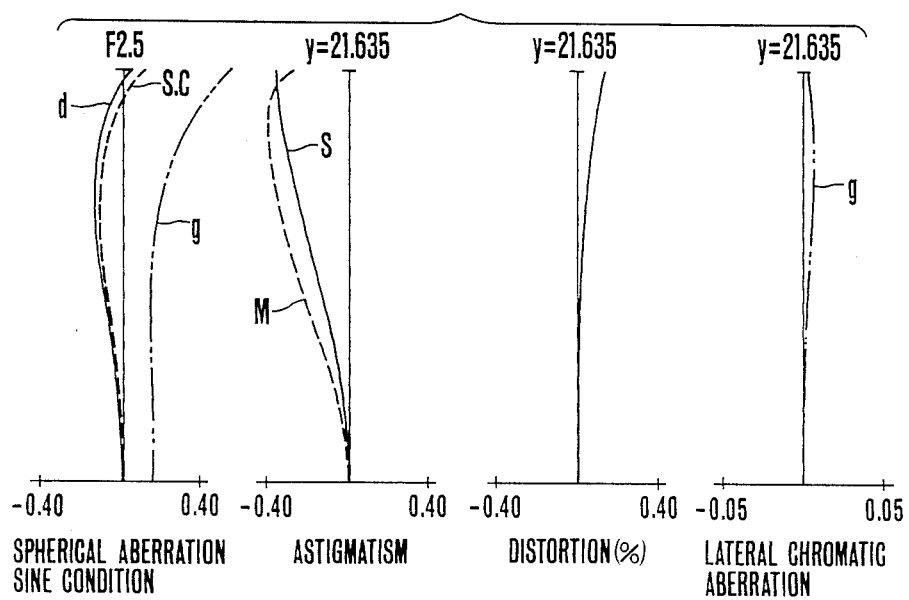

| Numerical Embodiment 2 (FIGS. 2, 5(A) and 5(B)): | | | |
|---|---|---|---|
| $f = 51.0$ $F = 2.5$ | | | |
| R1 = 128.763 | D1 = 2.59 | N1 = 1.69680 | ν1 = 55.5 |
| R2 = −93.786 | D2 = 0.15 | | |
| R3 = 23.263 | D3 = 2.70 | N2 = 1.80610 | ν2 = 40.9 |
| R4 = 68.363 | D4 = 0.75 | | |

-continued

| | | | |
|---|---|---|---|
| R5 = −1034.703 | D5 = 3.36 | N3 = 1.70154 | ν3 = 41.2 |
| R6 = 17.850 | D6 = 4.70 | | |
| R7 = Stop | D7 = 3.07 | | |
| R8 = −31.501 | D8 = 2.81 | N4 = 1.71736 | ν4 = 29.5 |
| R9 = −25.685 | D9 = 1.19 | | |
| R10 = 15.480 | D10 = 1.55 | N5 = 1.80518 | ν5 = 25.4 |
| R11 = 432.096 | D11 = 3.80 | N6 = 1.83400 | ν6 = 37.2 |
| R12 = −24.151 | D12 = 0.15 | | |
| R13 = −258.248 | D13 = 3.00 | N7 = 1.80400 | ν7 = 46.6 |
| R14 = −28.284 | D14 = Variable | | |
| R15 = 52.813 | D15 = 2.41 | N8 = 1.77250 | ν8 = 49.6 |
| R16 = 648.570 | D16 = 1.14 | N9 = 1.65844 | ν9 = 50.9 |
| R17 = 32.997 | D17 = Variable | | |
| R18 = 115.925 | D18 = 2.61 | N10 = 1.51835 | ν10 = 60.3 |
| R19 = 357.261 | | | |

| | Image Magnification | |
|---|---|---|
| | Infinitely Distant Object | Life-Size |
| D14 | 0.800 | 26.150 |
| D16 | 2.500 | 27.850 |

Figure 6A:
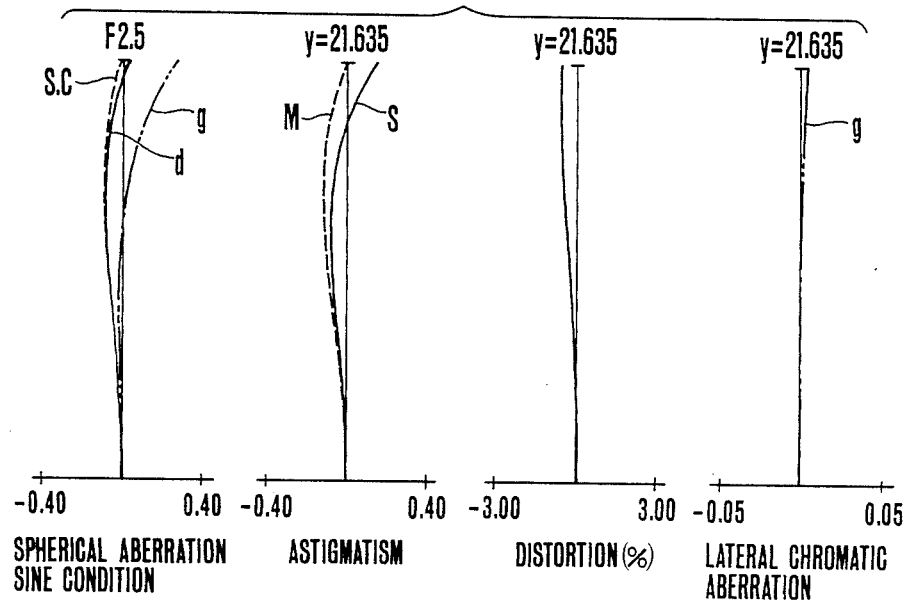
Figure 6B:
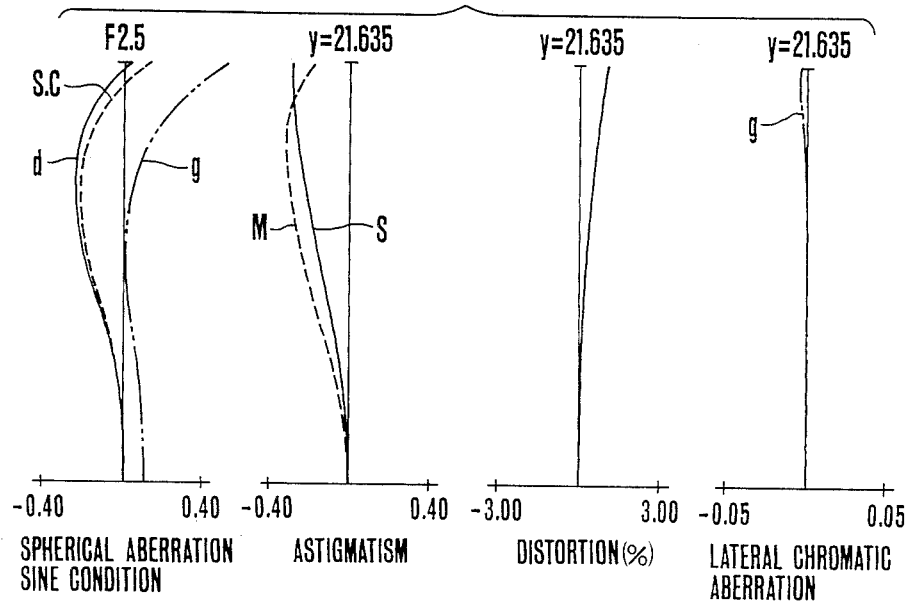

Numerical Embodiment 3 (FIGS 3, 6(A) and 6(B)):

f = 51.0 F = 2.5

| | | | |
|---|---|---|---|
| R1 = 267.298 | D1 = 3.00 | N1 = 1.69680 | ν1 = 55.5 |
| R2 = −97.829 | D2 = 0.15 | | |
| R3 = 23.889 | D3 = 2.60 | N2 = 1.80610 | ν2 = 40.9 |
| R4 = 63.962 | D4 = 0.70 | | |
| R5 = 476.071 | D5 = 3.45 | N3 = 1.70154 | ν3 = 41.2 |
| R6 = 18.344 | D6 = 0.72 | | |
| R7 = 26.132 | D7 = 2.90 | N4 = 1.72000 | ν4 = 43.7 |
| R8 = 28.250 | D8 = 3.50 | | |
| R9 = Stop | D9 = 5.27 | | |
| R10 = −14.220 | D10 = 1.47 | N5 = 1.80518 | ν5 = 25.4 |
| R11 = −1460.734 | D11 = 3.60 | N6 = 1.83400 | ν6 = 37.2 |
| R12 = −18.988 | D12 = 0.15 | | |
| R13 = 471.796 | D13 = 3.18 | N7 = 1.80400 | ν7 = 46.6 |
| R14 = −34.315 | D14 = Variable | | |
| R15 = 52.985 | D15 = 1.63 | N8 = 1.78590 | ν8 = 44.2 |
| R16 = 243.30 | D16 = 1.15 | N9 = 1.65844 | ν9 = 50.9 |
| R17 = 33.320 | D17 = Variable | | |
| R18 = 112.900 | D18 = 1.44 | N10 = 1.51633 | ν10 = 64.1 |
| R19 = 396.556 | | | |

| | Image Magnification | |
|---|---|---|
| | Infinitely Distant Object | Life-Size |
| D14 | 0.800 | 26.150 |
| D17 | 2.500 | 27.850 |

According to the present invention, the photographic lens is constructed from four lens units, of which the first, the second and the third lens units are made to move so as to satisfy the before-described condition, whereby a photographic lens well corrected for the variation of aberrations when focusing is performed on an object of a wide range from an infinitely distant object to a close object, of high performance and utilizing floating can be achieved.

What is claimed is:

1. A photographic lens comprising, from front to rear, a first lens unit of positive refractive power, a stop, a second lens unit of positive refractive power, a third lens unit of negative refractive power, and a fourth lens unit of positive refractive power, said first lens unit including a negative lens having a strong concave surface facing said stop, said second lens unit including at least one negative lens having a strong concave surface facing said stop, and, when focusing is performed from an infinitely distant object to a close object, said first lens unit and said second lens unit are moved forward in unison, while said third lens unit is moved by a less amount of movement than the amount of movement of the first and second lens units.

2. A photographic lens according to claim 1, wherein said third lens unit comprises a negative lens.

3. A photographic lens according to claim 2, wherein said third lens unit negative lens is of meniscus shape concave toward the image plane side.

4. A photographic lens according to claim 1, wherein said third lens unit has a positive lens and a negative lens.

5. A photographic lens according to claim 4, wherein said positive lens and negative lens of said third lens unit are cemented together to form a meniscus shape concave toward the image plane side.

6. A photographic lens according to claim 1, wherein at least one of said first lens unit and said second lens unit has a positive meniscus lens.

7. A photographic lens according to claim 1, wherein said fourth lens unit has a positive lens whose front surface has a stronger refractive power than the rear surface thereof.

8. A photographic lens according to claim 1, wherein said first lens unit includes, from front to rear, a positive lens, a positive meniscus lens having a convex surface facing the object side, and a negative lens having a concave surface facing the image plane side.

9. A photographic lens according to claim 1, wherein said second lens unit includes a cemented lens group comprising a negative lens having a concave surface facing the object side and a positive lens cemented together, and a positive lens having a convex surface facing the image plane side.

* * * * *

UNITED STATES PATENT AND TRADEMARK OFFICE
CERTIFICATE OF CORRECTION

PATENT NO. : 4,871,243
DATED : October 3, 1989
INVENTOR(S) : Ogawa, et al.

It is certified that error appears in the above-identified patent and that said Letters Patent is hereby corrected as shown below:

ON THE TITLE PAGE

[75] <u>Inventors</u>:

"Hideki Ogawa, Tokyo; Takashi Matsushita, Kanagawa, both of Japan--" should read --Hideki Ogawa, Chofu; Takashi Matsushita, Kawasaki, both of Japan--.

<u>COLUMN 1</u>:

Line 18, "lens".)" should read --lens").--.

Line 42, "GAUSS lens" should read --Gauss type lens--.

Line 57, "object," should read --objects--.

<u>COLUMN 2</u>:

Line 6, "invention" should read --invention,--.

Line 41, "at" should read --of--.

Line 42, "of" (first occurrence) should read --at--.

Line 51, "photograhic" should read --photographic--.

Line 52, "GAUSS" should read --Gauss--.

Line 53, "GAUSS" should read --Gauss--.

Line 62, "GAUSS" should read --Gauss--.

UNITED STATES PATENT AND TRADEMARK OFFICE
CERTIFICATE OF CORRECTION

| | | |
|---|---|---|
| PATENT NO. : | 4,871,243 | |
| DATED : | October 3, 1989 | |
| INVENTOR(S) : | Ogawa, et al. | |

It is certified that error appears in the above-identified patent and that said Letters Patent is hereby corrected as shown below:

COLUMN 3:

Line 13, "ot" should read --to--.

Line 29, "side," should read --side;--.

Line 30, "meniscus-shaped positive line 21" should read --meniscus-shaped negative lens 21--.

Line 68, "the movement," should read --this movement,--.

COLUMN 5:

Line R16-243.30" should read --R16=243.830--.

Signed and Sealed this

Eighteenth Day of February, 1992

*Attest:*

HARRY F. MANBECK, JR.

*Attesting Officer*      *Commissioner of Patents and Trademarks*